US009877207B2

(12) United States Patent
Joung et al.

(10) Patent No.: US 9,877,207 B2
(45) Date of Patent: Jan. 23, 2018

(54) CALIBRATION METHOD FOR CHANNEL SIMULATOR (71) Applicant: INNOWIRELESS CO., LTD., Seongnam-si, Gyeonggi-do (KR)

(72) Inventors: Jin Soup Joung, Seongnam-si (KR); Yong Hoon Lim, Seoul (KR); Kyoung Hwan Ju, Suwon-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 0 days.

(21) Appl. No.: 15/165,434

(22) Filed: May 26, 2016

(65) Prior Publication Data
US 2016/0353289 A1 Dec. 1, 2016

(30) Foreign Application Priority Data
May 27, 2015 (KR) .................. 10-2015-0073529

(51) Int. Cl.
*H04W 16/22* (2009.01)
*H04L 12/24* (2006.01)
*H04W 24/02* (2009.01)
*H04L 12/26* (2006.01)
*H04B 17/391* (2015.01)
*H04B 17/13* (2015.01)
*H04B 17/21* (2015.01)

(52) U.S. Cl.
CPC ........ *H04W 16/22* (2013.01); *H04B 17/3912* (2015.01); *H04L 41/0806* (2013.01); *H04L 43/0829* (2013.01); *H04W 24/02* (2013.01); *H04B 17/13* (2015.01); *H04B 17/21* (2015.01); *H04L 41/142* (2013.01)

(58) Field of Classification Search
CPC ............... H04B 17/21; H04B 17/0085; H04B 17/0087; H04B 17/11; H04B 17/12; H04B 17/318; H04B 17/13; H04B 17/3912; H04W 24/06; H04W 16/22; H04W 24/02; H04L 41/0806; H04L 41/142; H04L 43/0829
See application file for complete search history.

(56) References Cited

U.S. PATENT DOCUMENTS

| 6,438,357 B1* | 8/2002 | Oh ..................... H04B 17/0087 375/224 |
| 2012/0041745 A1* | 2/2012 | Spilman ................ G06F 11/261 703/13 |
| 2015/0288463 A1* | 10/2015 | Perthold ................ H04B 17/13 375/224 |

FOREIGN PATENT DOCUMENTS

| KR | 1995-0022211 A | 7/1995 |
| KR | 10-2001-0019997 A | 3/2001 |
| KR | 10-1286023 B1 | 7/2013 |

OTHER PUBLICATIONS

Joo-Hyun Lee et al. "Implementation of a Real-time Multipath Fading Channel Simulator using a Hybrid DSP-FPGA Architecture" 2004, pp. 17-23.

* cited by examiner

*Primary Examiner* — Thai Vu
(74) *Attorney, Agent, or Firm* — Novick, Kim & Lee, PLLC; Jae Youn Kim (57) ABSTRACT

A calibration method for a channel simulator is applied to a large-capacity channel simulator having the interfaces of P base stations and Q terminals so that path loss calibration for P×Q paths is more rapidly and easily performed.

7 Claims, 3 Drawing Sheets

CALIBRATION METHOD FOR CHANNEL SIMULATOR

BACKGROUND OF THE INVENTION

1. Field of the Invention

The present invention relates to a calibration method for a channel simulator, and more particularly, to a calibration method for a channel simulator, which is applied to a large-capacity channel simulator having the interfaces of P base stations and Q terminals so that path loss calibration for P×Q paths can be more rapidly and easily performed.

2. Description of the Related Art

Recently, as information society is accelerated, studies and researches have been actively carried out on multimedia communication systems to simultaneously process high-quality voice and data at high data rates. Meanwhile, mobile communication users have endlessly required higher-level communication quality, lower errors, and higher data rates, but designing a system required for a mobile communication channel is significantly difficult.

Under multi-path communication channels, line-of sight components, reflective components, and diffracted-wave components exist between a base station (BS), acting as a transmitter, and a mobile station (MS) or user equipment, serving as a receiver to exert influences on each other. The signals are received to a terminal and a Doppler spread occurs as the terminal is moved, which makes a propagation environment inferior to that of stationary communication.

In general, rural or suburban environments having the line-of sight signals may be explained using a Rician channel model, and composite signals caused by multi-paths, in which line-of sight components sparsely exist, represent Rayleigh distribution. In addition, the shading effect is appeared due to irregular surrounding topographies.

Since the wireless channels have significantly various propagation environments, the intrinsic performance of the wireless system must be represented even under different propagation environments. In order to ensure the performance of the wireless system, proto typing and a field test as well as the verification based on simulation and analysis are important to every service providers. However, the field test for a developed wireless system under all environments requires too much time, and costs. In order to more practically perform the field test, a real-time channel simulator must be used. The real-time channel simulator is referred to as a system capable of simulating almost all environments (The implementation of a multi-path fading channel simulator having a DSP-FPGA structure, volume 23, No. 1 (01, 2004), pp. 17-23, Joo-Hyun Lee et al).

Meanwhile, the fading mainly means the spatial variation of a signal intensity, but may mean the temporal variation according to the movement of a terminal. The fading includes a slow fading or long-term fading, such as propagation loss (path loss) in a free space, or the shadow effect, in which the intensity of a reception signal is slowly changed when the terminal is moved within a wide area, and fasting fading or short-term fading, such as frequency selective fading, frequency non-selective fading or Doppler spread fading, in which the intensity of the reception signal is rapidly changed when the terminal is moved in a narrow area. In a real environment, the slow fading and the fast fading are appeared together.

Until now, in order to realize a fading channel, an Okumura model, which is the most extensively used to estimate a signal in the downtown area, and a Hata model and a Jake model, which can be used even in a suburb and an open environment, have been employed. The slow fading is realized by simply applying only different delays for a starting signal according to various paths while the fast fading is realized by additionally multiplying the slow fading by a complex gain. Finally, the combination of the slow fading and the fast fading is output to the terminal or the base station.

Meanwhile, conventionally, a plurality of single channel simulators used to simulate an environment must be used between one base station and on terminal in order to simulate a real channel environment that a plurality of base stations and a plurality of terminals coexist to mutually affect each other, which significantly increases costs resulting from the repetition of the simulators in terms of functions or degrading the efficiency of space use. In order to solve the above problem, the applicant of the present invention has issued Korea Patent Registration No. 1286023 after filing the patent application on a large-capacity channel simulator configured to easily employ bi-directional path loss and bi-directional real-time fading.

In addition, when a large-capacity channel simulator is used, even if the same path loss (PL) is set to each of P base stations, Q terminals, and a channel simulator, when the base stations and the terminals are actually connected with the channel simulator, the PL may be varied due to various factors.

Therefore, in order to ensure the reliability of the analysis result through the channel simulator, it is very important to perform an advanced work that maintains all paths of the channel simulator with the same loss in the state that the base station and the terminal are actually connected with the channel simulator, and this work is referred to as calibration expressed as following Equation 1.

$$PL = A \circ PL' \quad \text{Equation 1}$$

$$= \begin{pmatrix} PL & \dots & PL \\ \dots & \dots & \dots \\ PL & \dots & PL \end{pmatrix}$$

$$= \begin{pmatrix} a_{11} & \dots & a_{1Q} \\ \dots & a_{ij} & \dots \\ a_{P1} & \dots & a_{PQ} \end{pmatrix} \circ \begin{pmatrix} PL_{11} & \dots & PL_{1Q} \\ \dots & PL_{ij} & \dots \\ PL_{P1} & \dots & PL_{PQ} \end{pmatrix}$$

$$PL = \begin{pmatrix} PL & \dots & PL \\ \dots & PL & \dots \\ PL & \dots & PL \end{pmatrix}$$

$$PL' = \begin{pmatrix} PL_{11} & \dots & PL_{1Q} \\ \dots & PL_{ij} & \dots \\ PL_{P1} & \dots & PL_{PQ} \end{pmatrix}$$

$$A = \begin{pmatrix} a_{11} & \dots & a_{1Q} \\ \dots & a_{ij} & \dots \\ a_{P1} & \dots & a_{PQ} \end{pmatrix}$$

$(A \circ B)_{ij} = a_{ij} = b_{ij}$ : Matrix Hadamard product

In Equation 1, PL represents a preset path loss matrix, PL' represents a path loss matrix, which is actually measured, and A represents a calibration matrix that equally maintains the loss of all paths. As shown in Equation 1, when the PL calibration is performed with respect to a channel simulator connected with P base stations and Q terminals, since calibration works must be performed by the number of paths corresponding to the product P×Q of P and Q must be performed, efforts and time are significantly required only for the calibration.

In addition, since the PL calibration must be performed in the state that the base stations and the terminals are actually connected with the channel simulator, if the connections between the channel simulator and the base station or the channel simulator and the terminal are released or the PL is not exactly measured on a cable to connect the calibration simulator and the base station or the terminal during the calibration work, errors may occur.

As related art, there is Korean Patent Registration No. 10-1286023 entitled "channel simulator".

SUMMARY OF THE INVENTION

In order to solve the above problem, an object of the present invention is to provide a calibration method for a channel simulator, which is applied to a large-capacity channel simulator having the interfaces of P base stations and Q terminals so that path loss calibration for P×Q paths can be more rapidly and easily performed.

In order to accomplish the above objects, according to a first feature of the present invention, there is provided a calibration method for a channel simulator that forms channels with respect to all paths between P base stations (P is an integer more than 2) and Q terminals (Q is an integer more than 2). The calibration method includes a base station power calibration step of equally maintaining P ADC powers of base station interface cards of the channel simulator, and a terminal path loss calibration step of equally maintaining Q DAC powers of terminal interface cards of the channel simulator in a state that one base station subject to the power calibration is connected with the Q terminals.

In above configuration, the base station power calibration step includes a step of adjusting a gain of an amplifier or an attenuation degree of an attenuator of the base station interface cards after measuring the P ADC powers of the base station interface cards of the channel simulator connected with the base stations.

In the terminal path loss calibration step, one base station is connected with the Q terminals, and the gain of the amplifier or the attenuation degree of the attenuator of the terminal interface cards in the channel simulator connected with the terminals is adjusted using RSRP or a path loss value of each terminal, such that the DAC powers of the terminal interface cards are equally maintained.

The RSRP or the path loss value of the terminal is acquired through a DM message from each terminal.

According to a second feature of the present invention, there is provided a calibration method for a channel simulator, in which channels are formed with respect to all paths between P base stations (P is an integer more than 2) and Q terminals (Q is an integer more than 2). The calibration method includes (a) inputting a base station signal having equal power after connecting the P base stations with one terminal, (b) capturing and measuring ADC powers of base station interface cards connected with the base stations, (c) performing calibration such that the ADC powers measured in step (b) are equal to each other, (d) checking RSRP or a path loss value of each terminal after inputting the base station signal in a state that one base station is connected with the Q terminals, and (e) performing the calibration such that DAC values of terminal interface cards connected with the terminals are equal to each other using the RSRP and the path loss value.

According to the above-described second feature, the calibration in step (c) is performed by adjusting a gain of an amplifier or an attenuation degree of an attenuator of the base station interface cards, and the calibration in step (e) is performed by adjusting a gain of an amplifies or an attenuation degree of an attenuator of the terminal interface card.

According to the above-described second feature, the RSRP and the path loss value of the terminal are acquired through a DM message from each terminal.

According to the calibration method for the channel simulator of the present invention, when the PL calibration is performed with respect to the P base stations and the Q terminals, the same calibration process is performed using two calibration vectors of P×1 and Q×1 instead of a P×Q calibration matrix, so that the time to be taken for the calibration process can be significantly reduced.

Further, since the P×1 and Q×1 vectors are realized using the gains of input/output amplifiers or the attenuation degree of the attenuator, the product operation can be completely removed form system design. Accordingly, the PL calibration can be effectively and easily performed.

DETAILED DESCRIPTION OF THE INVENTION

Hereinafter, a calibration method for a channel simulator according to an exemplary embodiment of the present invention will be described with reference to accompanying drawings. Before the description of the calibration method, the structure of a large-capacity channel simulator suggested by the applicant of the present invention will be described.

Figure 1:
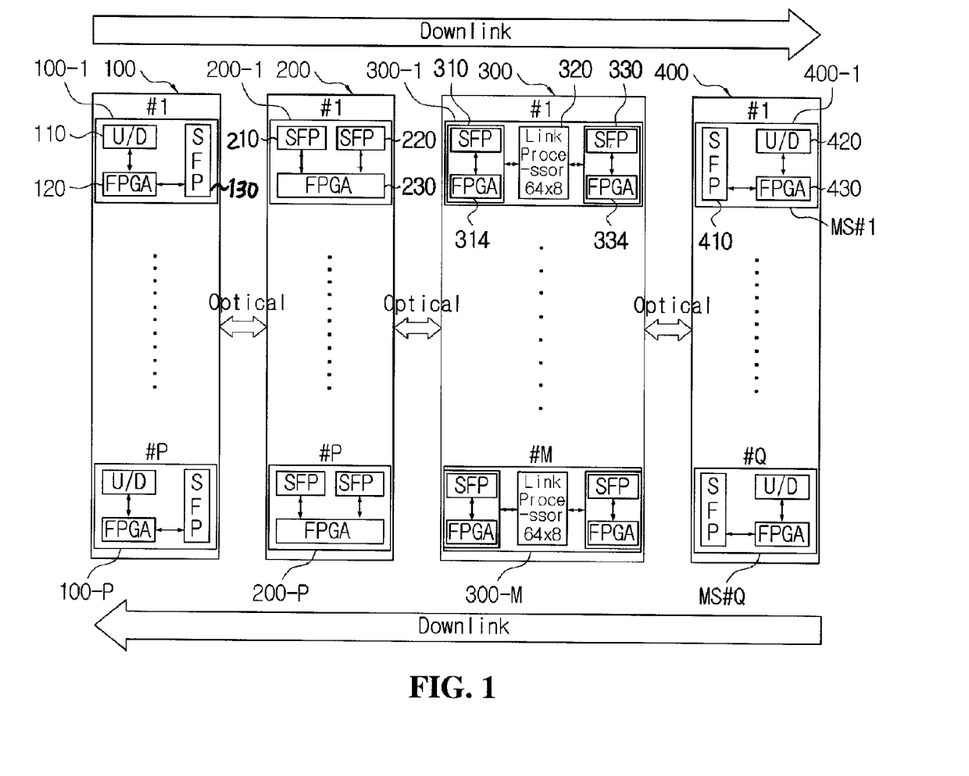
FIG. 1 is a block diagram showing a large-capacity channel simulator disclosed in the related art of the applicant of the present invention.

FIG. 1 is a block diagram showing a large-capacity channel simulator disclosed in the related art of the applicant of the present invention. Hereinafter, a function of processing a down-link signal and a function of processing an up-link signal will be individually described for the convenience of explanation.

Regarding a function of processing a downlink, the channel simulator according to the present invention includes a base station interface block 100 to output baseband signals obtained through down conversion for RF down-link signal inputs from a plurality (P) of base stations, a distribution/merge (DM) block 200 to replicate the baseband down-link signals, which are input from the P base stations and processed in the base station interface block 100 to a plurality (M) of baseband down-link signals and to output the replicated baseband down-link signals to a link process (LP) block 300 to be described, a link process block 300 to apply real-time fading to the baseband down-link signals of the base stations, which are input from the distribution/merge (DM) block 200 according to a plurality of channels and then to output baseband down-link fading signals to Q terminals, and a terminal interface block 400 to perform up-conversion with respect to the baseband down-link fading signals processed in the link process block 300 and to output the baseband down-link fading signals to the terminals as shown in FIG. 1.

In the above configuration, the base station interface block 100 may include a plurality of base station interface cards (100-1, 100-2, . . . and 100-P) to make one-to-one correspondence (many-to-one correspondence) with the P base stations and to process an RF down-link signal from the relevant base station. In this case, each of the base station interface cards 100-1, 100-2, . . . , and 100-P may internally include an up-down converter 110 to perform down conversion with respect to the RF down-link signal input from each base station, to convert the RF down-link signal into a baseband down-link signal (I/Q signal), to perform A/D conversion with respect to the converted baseband down-link signal to be output a digital signal (parallel signal), a serial type parallel converter 120 to convert the baseband down-link digital signals input from the up-down converter 110 in parallel into serial type baseband down-link digital signals, and a photo-electric converter 130 to convert serial type baseband downlink digital signals (electric signals) output from the serial type parallel converter 120 into a relevant optical signal.

The distribution/merge (DM) block 200 includes a plurality (P) of distribution/merge cards 200-1, 200-2 . . . , and 200-P having the same number of base station interface cards of 100-1, 100-2, . . . , and 100-P. Each of the distribution/merge cards 200-1, 200-2, . . . , and 200-P includes a front photoelectric converter 210 to convert an optical signal, which is output from each of the base station interface cards 100-1, 100-2, . . . , and 100-P having one-to-one correspondence with the distribution/merge cards 200-1, 200-2 . . . , and 200-P, into an electrical signal, a distributer/merger (distributor in the case of a downlink) 230 to convert a serial-type baseband downlink digital signal converted into the electric signal by the front photoelectric converter 210 into a parallel-type baseband down-link digital signal, to replicate the parallel-type baseband downlink digital signal to M baseband downlink digital signals, and to convert the M baseband downlink digital signals into serial-type baseband down-link digital signals, and a rear photoelectric converter 220 to convert the serial-baseband down-link digital signal (electric signal) input from the distributer/merger 230 into the relevant optical signal.

Next, the link process block 300 may include a plurality of M of link-process groups 300-1, 300-2, . . . , and 300-M. Each of the link process groups 300-1, 300-2, . . . , and 300-M includes a plurality of (P') of input/output units 310, each of input/output unit 310 including a photoelectric converter 312 to convert optical signals input from a plurality of rear photoelectric converters 220, for example, eight rear photoelectric converters 220 of the distribution/ merge (DM) block 200 into relevant electrical signals, and a serial-parallel converter 314 to convert an electric signal input from the photoelectric converter 312, that is, a serial-type baseband downlink digital signal into a parallel-type baseband downlink digital signal, for example, a 8-bit low voltage differential signaling (LVDS) signal, a plurality (Q') of link processors 320 to apply real-time fading to parallel-type baseband downlink digital signals output from the P' input/output units 310 and thus to generate baseband downlink fading signals to be transmitted a plurality (8) terminals, and a plurality (Q') rear input/output units 330 including a serial-parallel converter 334 to convert all parallel-type baseband downlink fading signal processed in the link processor 320 into the serial-type baseband down-link fading signals, and a photoelectric converter 332 to convert a serial-type baseband downlink fading signal (electric signal) output from the serial-parallel converter 334 into a relevant optical signal.

The terminal interface block 400 may include a plurality (Q) of terminal interface cards 400-1, 400-2, . . . and 400-Q making one-to-one correspondence (or many-to-one correspondence), and each of the terminal interface cards 400-1, 400-2, . . . and 400-Q includes a photoelectric converter 410 to convert the optical signal output from the rear input/output unit 330 into a relevant electrical signal, which is a baseband down-link fading signal, to be transmitted to each terminal, a serial-parallel converter 430 to convert a serial-type baseband down-link fading signal, which is output from the photoelectric converter 420, into a parallel-type baseband downlink fading signal, and an up-down converter 420 to perform up conversion with respect to the analog-shape baseband downlink fading signal obtained by D/A converting the baseband down-link fading signal output from the serial-parallel converter 430, and to output the analog-shape baseband downlink fading signal to the terminal.

Although the above description has been made with respect to the down-link channel of the channel simulator, the up-link channel has the same configuration or function as that of the down link channel except that the up-down converter 420 of each of the terminal interface cards 400-1, 400-2, and 400-Q performs the down conversion and the A/D conversion, and each distributer/merger 230 serves as a merger, and the upper-down converter 110 of each of the base station interface card 100-1, 100-2, . . . , and 100-P performs up-conversion and D/A conversion. Since the details of other remaining components have been described in Korean Patent Registration No. 10-1286023, the details thereof will be omitted hereinafter.

Figure 2:
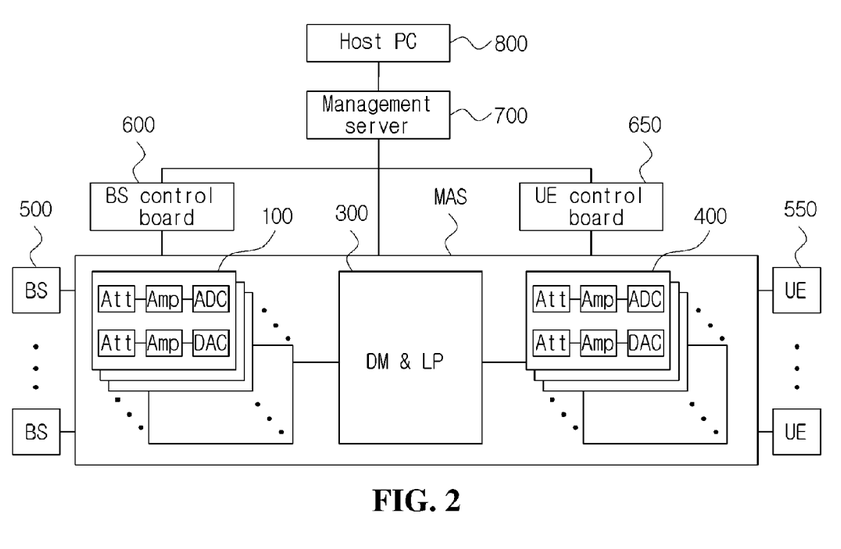
FIG. 2 is a block diagram of a large-capacity simulator system to realize a calibration method for a channel simulator according to the present invention.

FIG. 2 is a block diagram showing the large-capacity simulator system to realize the calibration method of the channel simulator according to the present invention. As shown in FIG. 2, the channel simulator system to realize the calibration method according to the present invention may include a channel simulator (massive air interface channel simulator, MAS) shown in FIG. 1. Meanwhile, although not shown in FIG. 1, the up-down converter 110 of each base station interface card (BS I/F) 100-1, 100-2, . . . , 100-P includes an attenuator (Att) to set (provide) an environment having mutually different path losses according to base stations, an amplifier (Amp), and an A/D converter ADC to perform the A/D conversion for the down-link channel (down converter). In other words, a D/A converter (DAC), an amplifier (Amp), and an attenuator (Att) are provided to configure an up-link channel (up-converter). Similarly, the up-down converter 420 of each of terminal interface cards (UE I/F card) 400-1, 400-2, . . . , 400-Q includes a D/A converter (DAC), an amplifier (Amp), and an attenuator (Att) for a down-link channel (up-converter) so that an environment having mutually different path losses may be set (provided) according to terminals, and includes an attenuator (Att), an amplifier (Amp), and an A/D converter (ADC) to perform A/D conversion for an up-link channel (down-converter).

In this case, the configuration including the amplifier (Amp) and the attenuator (Att) of each up-down converter 110 or 420 is achieved through a variable configuration that at least one of the amplifier (Amp) and the attenuator (Att) is adjustable in the outside. In this case, the amplifier (Amp) and a variable attenuator (Att) having mutually different power-level adjustment resolution may be used. In addition, the configuration including the combination of the amplifier (Amp) and the attenuator (Att) of each up-down converter 110 or 420 may include a single variable amplifier or a single variable attenuator.

Referring to FIG. 2 again, the channel simulator system according to the present invention includes the above-described channel simulator (MAS), a plurality of base stations (BS) 500, for example, P base stations 500 connected with a plurality of base station I/F cards, which are provided in the base station interface block 100, with one-to-one correspondence, or 1-to-may correspondence, a plurality of user equipment (P) 550, for example, Q user equipment connected to a plurality of UE I/F cards of the terminal interface block 400 of the channel simulator MAS with one-to-one correspondence, or 1-to-many correspondence, a BS control hoard 600 to adjust the gain of the amplifier (Amp) of each BS I/F card of the channel simulator (MAS) or the attenuation degree of the attenuator (Att), a UE control hoard 650 to adjust the gain of each UE I/F interface card of the channel simulator (MAS) or the attenuation degree of the attenuator (Att), a host PC 800 having a user interface (UI) program to receive a required carrier frequency from a user and receive various scenarios, such as the connection between the base station and the terminal, and fading parameters between the base station and the parameter, and a management server 700 to control, in the state that the various scenarios set in the host PC 800 are stored in the form of a data file, a base station control board 600, a terminal control board 650, and the operation of the channel simulator (MAS) according to the scenario file.

In the above-described configuration, one base station control board 600 and one terminal control hoard 650 may control a plurality of BS I/F cards and a plurality of UE I/F cards, for example, 12 BS I/F cards and 12 UE I/F cards. The management server 700 may store A/D conversion data (ADC data) of the BS I/F card related to the PL calibration or calibration data therefor and issue a calibration instruction, that is, an instruction to control the gain of the amplifier (Amp) of the BS card or the attenuation degree of the attenuator (Att). The management server 700 collects a diagnostic monitoring message (DM) from each terminal and issues an instruction to control the gain of the amplifier (Amp) of the UE I/f card or the attenuation degree of the attenuator (Att) to the terminal control board 650 according to the DM message. The management server 700 may realize the fading channel in the unit of 1 ms in the case of a real time system, for example, an LTE system by controlling the link processor of a channel simulator (MAS) based on the scenario file. The host PC 800, the management server 700, the base station control card 600, and the terminal card 650 may be connected with each other over Ethernet.

Hereinafter, the calibration method for the channel simulator according to the present invention will be described. According to the present invention, in order to solve the problem occurring in the method according to the related art, that is, the problem of finding a calibration matrix A including many elements (P×Q elements), the power of P base station signals is measured by the ADC of the BS I/F card, and base station power calibration is performed to identically maintain the power of the P base station signals. Thereafter, the receiving power of Q terminals is recognized, and terminal path loss calibration is performed to identically maintain the receiving power of the Q terminals. As described above, according to the present invention, the procedure of finding the path loss calibration matrix of A having P×Q elements is simplified to the procedure of finding P×1 and Q×1 vectors, so that the calibration can be more rapidly performed.

In more detail, the path loss $PL_{ij}$ of a $j^{th}$ terminal in an $i^{th}$ base station may be divided an ADC input component and a DAC output component as expressed in Equation 2, and the matrix form thereof is expressed as shown in Equation 3.

$$PL_{ij} = PL_{ADC,i} * PL_{DAC,j} \quad \text{Equation 2}$$
$$i = 1 \ldots P, j = 1 \ldots Q$$

$$PL = PL_{ADC} \cdot PL_{DAC}^{T} \quad \text{Equation 3}$$

$$PL_{ADC} = \begin{pmatrix} PL_{ADC,1} \\ \ldots \\ PL_{ADC,P} \end{pmatrix}$$

$$PL_{DAC} = \begin{pmatrix} PL_{DAC,1} \\ \ldots \\ PL_{DAC,Q} \end{pmatrix}$$

$T$: matrix transpose
$\cdot$: matrix multiplication

Figure 3:
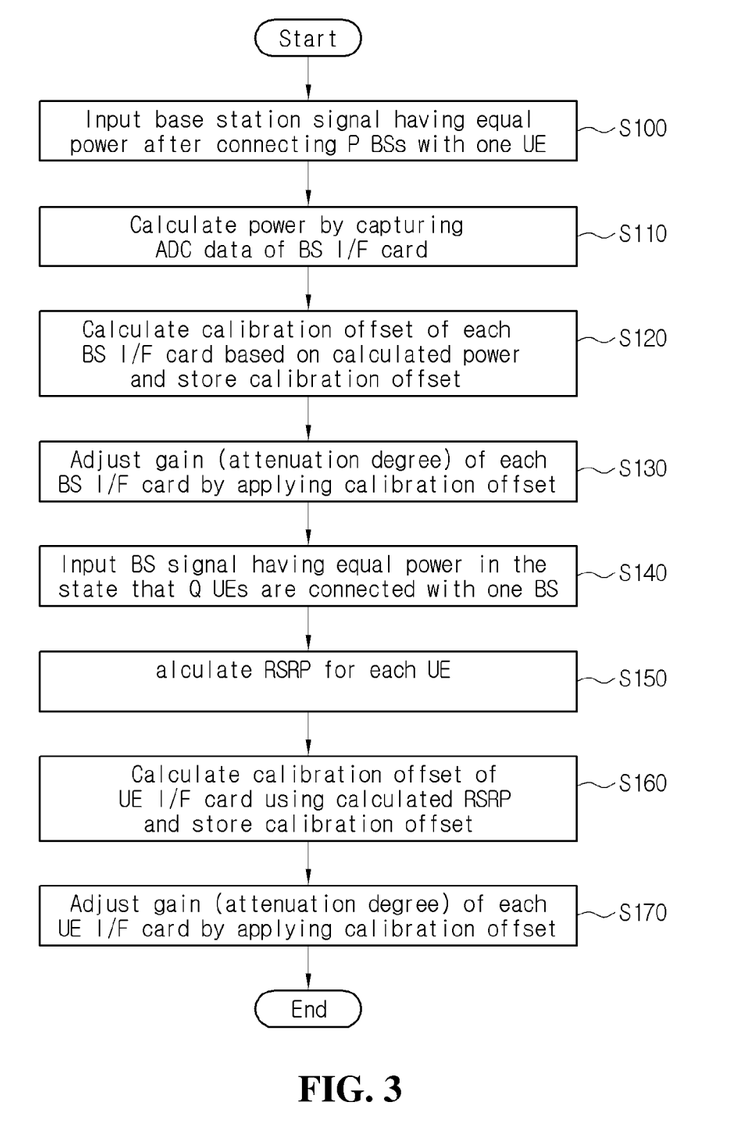
FIG. 3 is a flowchart to explain the calibration method for the channel simulator according to the present invention.

When the path loss $PL_{ij}$ of Equation 2 is processed as a single component, the calibration matrix of A having P×Q elements is required as expressed in Equation 1. If the path loss $PL_{ij}$ is divided in the unit of $PL_{ADC,i}$ and $PL_{DAC,j}$ and processed as shown in FIG. 3, the path loss $PL_{ij}$ may be simply defined as the product of the two vectors as shown in Equations 4 and 5. In other words, the path loss calibration work for the P×Q paths is simplified to a path loss calibration work for the (P+Q) paths.

$$PL_{ADC} = A_{ADC} \circ PL'_{ADC} \quad \text{Equation 4}$$

$$= \begin{pmatrix} PL_{ADC} \\ \ldots \\ PL_{ADC} \end{pmatrix}$$

$$= \begin{pmatrix} a_{ADC,1} \\ \ldots \\ a_{ADC,P} \end{pmatrix} \circ \begin{pmatrix} PL'_{ADC,1} \\ \ldots \\ PL'_{ADC,P} \end{pmatrix}$$

$$= \begin{pmatrix} a_{ADC,1} PL'_{ADC,1} \\ \ldots \\ a_{ADC,P} PL'_{ADC,P} \end{pmatrix}$$

$$A_{ADC} = \begin{pmatrix} a_{ADC,1} \\ \ldots \\ a_{ADC,P} \end{pmatrix}$$

$$PL'_{ADC} = \begin{pmatrix} PL'_{ADC,1} \\ \ldots \\ PL'_{ADC,P} \end{pmatrix}$$

$$PL_{DAC} = A_{DAC} \circ PL'_{DAC} \quad \text{Equation 5}$$

$$= \begin{pmatrix} PL_{DAC} \\ \ldots \\ PL_{DAC} \end{pmatrix}$$

$$= \begin{pmatrix} a_{DAC,1} \\ \ldots \\ a_{DAC,Q} \end{pmatrix} \circ \begin{pmatrix} PL'_{DAC,1} \\ \ldots \\ PL'_{DAC,Q} \end{pmatrix}$$

$$= \begin{pmatrix} a_{DAC,1} PL'_{1,DAC} \\ \ldots \\ a_{DAC,P} PL'_{P,DAC} \end{pmatrix}$$

$$A_{DAC} = \begin{pmatrix} a_{DAC,1} \\ \dots \\ a_{DAC,Q} \end{pmatrix}$$

$$PL'_{DAC} = \begin{pmatrix} PL'_{DAC,1} \\ \dots \\ PL'_{DAC,Q} \end{pmatrix}$$

FIG. 3 is a flowchart to explain the calibration method for the channel simulator according to the present invention. As shown in FIG. 3, according to the calibration method for the channel simulator of the present invention, in the state that P base stations (BSs) are connected with one UE in step S100, the base station signal having the same power is input each BS I/F card of the channel simulator (MAS). Step 100 may be performed as follows. If a user sets a scenario that one terminal is connected with P base stations placed at the same position through the host PC 800, the management server 700 controls the link processor 300 of the channel simulator MAS according to the scenario described above.

Next, in STEP 110, after capturing the ADC data of each BS I/F card, the power is calculated. In the step S120, the calibration offset of each BS I/F card is calculated based on calculated power and stored. Steps S110 and S120 may be performed by the management server 700.

The calculation of power $P_{ADC,i}$ based on the ADC data input from an $i^{th}$ base station may be performed through Equation 6.

$$P_{ADC,i} = 1/N \sum_{n=0}^{N-1} [x_{i,re}^2(n) + x_{i,im}^2(n)] \quad \text{Equation 6}$$

$x_{i,re}^2(n)$: i_th eNB baseband ADC real signal $x_{i,im}^2(n)$: i_th eNB baseband ADC imaginary signal N: # of samples In Equation 6, N represents a value appropriate to a calibration performance criterion, and a calibration offset $a_i$, which is the gain of the amplifier or the attenuation degree of the attenuator of the BS I/F card calibrated to have the same power $PL_{ADC}$ with respect to $P_{ADC,i}$ calculated as described above.

The calibration offset at may be found through following Equation 7.

$$a_i = PL_{ADC}/P_{ADC,i} \quad \text{Equation 7}$$

Referring to FIG. 3 again, in step S130, the gain of the amplifier of each BS I/F card or the attenuation degree of the attenuator is adjusted by applying the calibration offset $a_i$ calculated in step S120, so that the base station signal having the same power is input into all base stations. In this case, the base station power calibration is completed so that the same AC power is output in all BS I/F cards.

After the base station power calibration has been completed as described above, terminal path loss calibration is performed. To this end, in step S140 in the state that one predetermined base station is connected with Q terminals, base station signals having the same power are input the channel simulator (MAS) from all base stations. Step 140 may be performed as follows. If a user sets a scenario that Q terminals are connected with one base station placed at the same position through the host PC 800, the management server 700 controls the link processor 300 of the channel simulator MAS according to the scenario described above so that the gain of the link processor 300 becomes zero.

Next, in step S150, a DM message for reference signal received power (RSRP) or PL (path loss) (PL may be obtained only in the state that the terminal is attached to the base station) of each UE is obtained. Step S150 may be performed by the management server 700. Since $RSRP_j$, which is RSRP at a predetermined terminal, may be calculated through Equation 8, the calculation may be performed by the relevant terminal or the management server 700.

$$RSRP_j = 1/N \sum_{n=0}^{N-1} RSRP_j(n) \quad \text{Equation 8}$$

In Equation 7, N represents a value appropriate to a calibration performance criterion, and a calibration offset $a_j$, which is the gain of the amplifier or the attenuation degree of the attenuator of the UE I/F card calibrated to have the same power $PL_{ADC}$, which is DAC power of the UE I/F card, is calculated using $RSRP_j$ calculated as describe above in step S160.

The calibration offset $a_j$ may be found through following Equation 9.

$$a_j = PL_{DAC}/RSRP_j \quad \text{Equation 9}$$

Next, in step S170, the gain of the amplifier of each UE I/F card or the attenuation degree of the attenuator is adjusted by applying the calibration offset $a_i$ calculated in step S160, thereby completing the terminal power calibration that the same DAC power is output from all UE I/F cards. As a result, all path loss calibration for a downlink channel is completed.

Meanwhile, in order to apply the scheme of the downlink path loss calibration to the uplink path loss calibration, the BS must check the power of a signal received from each terminal. However, it is difficult to check the information between the BS and the UE in real time by synchronizing the base station with the terminal. Accordingly, the uplink path loss calibration is performed based on the DM message of the terminal without the use of the base station information. To this end, in the state that Q UEs are connected with one BS, up-link full load traffic is applied. Next, after acquiring $T \times P_j'$, which is up link transmission power in each UE, and $N_{RB}'$ information, which is the up-link resource block (RB), through the DM message of each terminal, the uplink transmission power per resource block is calculated through Equation 10.

$$T \times P_j = T \times P_j'/N_{RB}' \quad \text{Equation 10}$$

Next, $P_{ADC,j}$, which is output power of an ADC of the UE I/F card of the channel simulator, and $P_{ADC,j}$, which is power per RB, are calculated through Equation 11.

$$P_{ADC,j} = P_{ADC,j}'/N_{RB} \quad \text{Equation 11}$$

Next, the calibration is performed in the same manner as that of the down link path loss calibration by applying $P_{ADC,j}$.

As described above, although the calibration method for the channel simulator according to the exemplary embodiment of the present invention has been described for the illustrative purpose, various modifications and changes are possible within the technical scope of the present invention. Accordingly, the scope of the present invention should be defined by accompanying claims.

The calibration method for the channel simulator according to the present invention is not restricted through hardware configuration of FIG. 1. For example, in the case of a smaller channel simulator, the distribution/merge block 200 may be removed. The function of the management server 700 may be appropriately divided in a smaller functional unit.

Meanwhile, the connection and the disconnection between the BS and the UE may be performed by controlling a hardware switch or a software switch to connect the BS to the UE or disconnect the BS from the UE in the state that a plurality of BSs and a plurality of UEs are physically connected with a BS interface card and a UE interface card, respectively.

What is claimed is:

1. A calibration method for a channel simulator that forms channels with respect to all paths between P base stations (P is an integer more than 2) and Q terminals (Q is an integer more than 2), the calibration method comprising:
   a base station power calibration step of equally maintaining P analog/digital converter (ADC) powers of base station interface cards of the channel simulator; and
   a terminal path loss calibration step of equally maintaining Q digital/analog converter (DAC) powers of terminal interface cards of the channel simulator in a state that one base station subject to the power calibration is connected with the Q terminals,
   wherein the calibrated ADC power of each of the base station interface cards ($PL_{ADC}$) is defined as follows:

$$PL_{ADC} = A_{ADC} \circ PL'_{ADC},$$

$$\text{wherein } A_{ADC} = \begin{pmatrix} a_{ADC,1} \\ \ldots \\ a_{ADC,P} \end{pmatrix},$$

$$\text{wherein } PL'_{ADC} = \begin{pmatrix} PL'_{ADC,1} \\ \ldots \\ PL'_{ADC,P} \end{pmatrix},$$

and
   wherein $A_{ADC}$ is a calibration matrix and $PL_{ADC}'$ is a measured ADC power matrix, and
   wherein the calibrated DAC power of each of the terminal interface cards ($PL_{DAC}$) is defined as follows:

$$PL_{DAC} = A_{DAC} \circ PL'_{DAC},$$

$$\text{wherein } A_{DAC} = \begin{pmatrix} a_{DAC,1} \\ \ldots \\ a_{DAC,Q} \end{pmatrix},$$

$$\text{wherein } PL'_{DAC} = \begin{pmatrix} PL'_{DAC,1} \\ \ldots \\ PL'_{DAC,Q} \end{pmatrix},$$

and
   wherein $A_{DAC}$ is another calibration matrix and $PL_{DAC}'$ is a measured DAC power matrix.

2. The calibration method of claim 1, wherein the base station power calibration step further comprises:
   adjusting a gain of an amplifier or an attenuation degree of an attenuator of the base station interface cards after measuring the P ADC powers of the base station interface cards of the channel simulator connected with the P base stations.

3. The calibration method of claim 1, wherein, in the terminal path loss calibration step, a gain of an amplifier or an attenuation degree of an attenuator of the terminal interface cards in the channel simulator connected with the Q terminals is adjusted using a reference signal received power (RSRP) or a path loss value of each terminal, such that the DAC powers of the terminal interface cards are equally maintained.

4. The calibration method of claim 3, wherein the RSRP or the path loss value of each terminal is acquired through a diagnostic monitoring (DM) message from each terminal.

5. A calibration method for a channel simulator, in which channels are formed with respect to all paths between P base stations (P is an integer more than 2) and Q terminals (Q is an integer more than 2), the calibration method comprising:
   (a) inputting a base station signal having equal power after connecting the P base stations with one terminal;
   (b) capturing and measuring analog/digital converter (ADC) powers of base station interface cards connected with the base stations;
   (c) performing a calibration such that the ADC powers measured in step (b) are equal to each other;
   (d) checking a reference signal received power (RSRP) or a path loss value of each terminal after inputting the base station signal in a state that one base station is connected with the Q terminals; and
   (e) performing the calibration such that digital/analog converter (DAC) powers of terminal interface cards connected with the Q terminals are equal to each other using the RSRP and the path loss value,
   wherein the calibrated ADC power of each of the base station interface cards ($PL_{ADC}$) is defined as follows:

$$PL_{ADC} = A_{ADC} \circ PL'_{ADC},$$

$$\text{wherein } A_{ADC} = \begin{pmatrix} a_{ADC,1} \\ \ldots \\ a_{ADC,P} \end{pmatrix},$$

$$\text{wherein } PL'_{ADC} = \begin{pmatrix} PL'_{ADC,1} \\ \ldots \\ PL'_{ADC,P} \end{pmatrix},$$

and
   wherein $A_{ADC}$ is a calibration matrix and $PL_{ADC}'$ is a measured ADC power matrix, and
   wherein the calibrated DAC power of each of the terminal interface cards ($PL_{DAC}$) is defined as follows:

$$PL_{DAC} = A_{DAC} \circ PL'_{DAC},$$

$$\text{wherein } A_{DAC} = \begin{pmatrix} a_{DAC,1} \\ \ldots \\ a_{DAC,Q} \end{pmatrix},$$

$$\text{wherein } PL'_{DAC} = \begin{pmatrix} PL'_{DAC,1} \\ \ldots \\ PL'_{DAC,Q} \end{pmatrix},$$

and
   wherein $A_{DAC}$ is another calibration matrix and $PL_{DAC}'$ is a measured DAC power matrix.

6. The calibration method of claim 5, wherein the calibration in step (c) is performed by:
   adjusting a gain of an amplifier or an attenuation degree of an attenuator of the base station interface cards; and
   adjusting a gain of an amplifier or an attenuation degree of an attenuator of each terminal interface card.

7. The calibration method of claim 6, wherein the RSRP and the path loss value of each terminal is acquired through a diagnostic monitoring (DM) message from each terminal.

\* \* \* \* \*